Patented Jan. 4, 1944

2,338,119

UNITED STATES PATENT OFFICE 2,338,119

PROCESS FOR THE PRODUCTION OF HYDROCARBON OILS

Walter Kroenig, Wilhelm v. Fuener, and Georg Grassl, Ludwigshafen - on - the - Rhine, Germany; vested in the Alien Property Custodian No Drawing. Application January 21, 1941, Serial No. 375,250. In Germany February 10, 1940

6 Claims. (Cl. 196—53)

The present invention relates to a process for the production of hydrocarbon oils.

As is known, normally liquid carbonaceous materials, as for example tars, mineral oils and other high-boiling hydrocarbon products, as for instance residues from distillation, hydrogenation or cracking, as well as normally solid, but readily fusible carbonaceous materials, as for example asphalts, pitches, paraffin wax, montan wax and like materials, can be converted into more valuable oils, as for example gasoline, middle oils and heavy oils, by catalytic destructive hydrogenation in the liquid phase (often referred to as sump-phase) at temperatures above 350° C. under a pressure of at lease 20 atmospheres.

We have now found that, as compared with the catalysts hitherto commonly employed in the liquid phase conversion of carbonaceous materials which are liquid under the reaction conditions, as for example ferric oxide or molybdenum oxide, higher throughputs of initial material can be used and the quantity of undesirable gaseous hydrocarbons formed markedly reduced by operating in the presence of a catalyst containing iron which is prepared with the employment of a carrier substance and of a titanium sulphate which is soluble in water and dilute acid, as for instance titanyl sulphate, or a soluble complex organic titanium salt, as for example titanium-ammonium oxalate or titanium-ammonium tartrate.

In preparing a catalyst of the said kind, for example a carrier substance of any kind is soaked with aqueous solutions of an iron salt and for example of titanyl sulphate (and of other metal salts, if desired) and dried at moderately elevated temperatures, for example at from 100 to 300° C., if desired in a current of hydrogen or hydrogen sulphide.

As carriers which have proved highly suitable for the purpose here in question may be mentioned, for example ordinary or low temperature, coke, charcoal or active charcoal, but other, in particular porous, materials, as for example natural or artificial aluminum or magnesium silicates, bauxite, active alumina or active silica may also be employed. When using a carrier substance which mainly consists of an iron compound, as for example bog iron ore or the residues containing iron oxide obtained in the dry or wet decomposition of bauxite which are largely used for gas purification purposes and are commonly known in the trade under the designation "Lux mass" and "Bayer mass" an impregnation with a solution of a titanium sulphate or of a soluble complex organic titanium salt alone will be sufficient.

It has been found to be of advantage to employ the titanium in a smaller proportion than iron (calculated as free metals), the titanium amounting generally to from 10 to 70 per cent, more advantageously from 15 to 60 per cent, of the quantity of iron.

The catalyst is added to the initial material preferably in an amount of about from 0.1 to 10 per cent, advantageously from 0.5 to 5 per cent.

The destructive hydrogenation of the high-boiling or fusible carbonaceous materials is preferably carried out at a temperature of from 400° to 600° C. under a pressure of, for example, from 100 to 1000 atmospheres, advantageously of more than 400 atmospheres. It has been found of advantage to recycle part of the high-boiling residues obtained during the destructive hydrogenation and thus to ensure a higher concentration of catalyst in the reaction vessel.

The following example serves to illustrate how the present invention may be carried out in practice, but the invention is not restricted to this example.

*Example*

Dusty brown coal producer ash as a carrier substance is soaked with an aqueous solution of ferrous sulphate and then with a solution of titanyl sulphate so that the carrier, after being dried at about 100° C., contains 7 per cent of ferrous sulphate and 5 per cent of titanyl sulphate. The catalyst so prepared is added in an amount of 1.5 per cent to a mineral coal high temperature tar residue boiling above 325° C. The mixture is then heated together with hydrogen in a gas-heated tubular heater under a pressure of 600 atmospheres and then passed through an enlarged reaction vessel at 475° C. The reaction vessel is connected with a separator heated to 450° C. in which the material leaving the reaction vessel is separated into vaporous and liquid fractions. The liquid fraction is withdrawn at the bottom of the separator in an amount of 50 per cent (with reference to the initial material) and centrifuged. The oil thereby obtained is returned to the reaction vessel together with a fresh quantity of initial material. The residue obtained in the centrifuging operation which contains 60 per cent of solids is also in part returned to the reaction vessel at the rate of 0.1 part of centrifuging residue to 1 part of initial material. In this manner the catalyst concentration in the reaction vessel is kept at about 20 per cent (referred to the liquid contents). The balance of the centrifuging residue is subjected to a low temperature carbonization and the oil so obtained is used as a diluent for the material to be centrifuged.

The vapors leaving the separator consist of about equal proportions of fractions boiling up to 325° C. and of heavy oil boiling above 325° C.; the heavy oil is converted by another destructive hydrogenation into gasoline and middle oil in a second reaction vessel in the presence of a catalyst consisting of alumina and molybdenum oxide, provision being made for a continuous recycling of the higher boiling fractions of the resulting products to said second reaction vessel.

When hydrogenating the tar residue in the presence of one of the usual sump-phase catalysts, which is prepared by soaking dusty brown coal producer ash with a solution of so much ferrous sulphate that the catalyst contains 10 per cent of ferrous sulphate after drying, the formation of gaseous hydrocarbons is higher by about 30 per cent and the throughput lower by about 20 per cent than in the case of the catalyst above described.

What we claim is:

1. A process for the production of a hydrocarbon oil from a high-boiling carbonaceous substance which is liquid under the reaction conditions, by catalytic destructive hydrogenation at a temperature above 350° C. under a pressure of at least 20 atmospheres, which comprises operating in the presence of a catalyst containing iron which has been prepared with the employment of a carrier substance and of a titanium salt which is soluble in water and dilute acid selected from the group consisting of titanium sulphates and complex organic titanium salts.

2. A process for the production of a hydrocarbon oil from a high-boiling carbonaceous substance which is liquid under the reaction conditions, by catalytic destructive hydrogenation at a temperature above 350° C. under a pressure of at least 20 atmospheres, which comprises operating in the presence of a catalyst containing iron which has been prepared with the employment of a carrier substance and of titanyl sulphate.

3. A process for the production of a hydrocarbon oil from a high-boiling carbonaceous substance which is liquid under the reaction conditions, by catalytic destructive hydrogenation at a temperature above 350° C. under a pressure of at least 20 atmospheres, which comprises operating in the presence of a catalyst prepared by soaking a carrier substance with a solution of an iron salt and of a titanium salt which is soluble in water and dilute acid selected from the group consisting of titanium sulphates and complex organic titanium salts and heating it.

4. A process for the production of a hydrocarbon oil from a high-boiling carbonaceous substance which is liquid under the reaction conditions, by catalytic destructive hydrogenation at a temperature above 350° C. under a pressure of at least 20 atmospheres, which comprises operating in the presence of a catalyst prepared by soaking a carrier substance which for the greater part consists of an iron compound, with a solution of a titanium salt which is soluble in water and dilute acid selected from the group consisting of titanium sulphates and complex organic titanium salts and heating it.

5. A process for the production of a hydrocarbon oil from a high-boiling carbonaceous substance which is liquid under the reaction conditions, by catalytic destructive hydrogenation at a temperature above 350° C. under a pressure of at least 20 atmospheres, which comprises operating in the presence of a catalyst containing iron which has been prepared with the employment of a carrier substance and of a titanium salt which is soluble in water and dilute acid selected from the group consisting of titanium sulfates and complex organic titanium salts, the proportion of titanium and iron in said catalyst being between about 1:10 and 7:10.

6. A process for the production of a hydrocarbon oil from a high-boiling carbonaceous substance which is liquid under the reaction conditions, by catalytic destructive hydrogenation at a temperature above 350° C. under a pressure of at least 20 atmospheres, which comprises operating in the presence of a catalyst containing iron which has been prepared with the employment of a carrier substance and of titanyl sulphate, the proportion of titanium and iron in said catalyst being between about 1:10 and 7:10.

WALTER KROENIG.
WILHELM v. FUENER.
GEORG GRASSL.